United States Patent
Purcell et al.

(10) Patent No.: US 7,499,917 B2
(45) Date of Patent: Mar. 3, 2009

(54) PROCESSING CROSS-TABLE NON-BOOLEAN TERM CONDITIONS IN DATABASE QUERIES

(75) Inventors: Terence Patrick Purcell, New Berlin, IL (US); Thomas Abel Beavin, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/046,278

(22) Filed: Jan. 28, 2005

(65) Prior Publication Data

US 2006/0173833 A1 Aug. 3, 2006

(51) Int. Cl.
*G06F 17/30* (2006.01)
(52) U.S. Cl. .................... 707/3; 707/2; 707/10
(58) Field of Classification Search ............. 707/3, 707/2, 100, 4; 705/5
See application file for complete search history.

(56) References Cited

U.S. PATENT DOCUMENTS

| 5,367,675 | A | * | 11/1994 | Cheng et al. ............ 707/2 |
| 5,590,319 | A | * | 12/1996 | Cohen et al. ............ 707/4 |
| 6,112,198 | A | * | 8/2000 | Lohman et al. ............ 707/3 |
| 6,112,204 | A | | 8/2000 | Horowitz |
| 6,289,334 | B1 | * | 9/2001 | Reiner et al. ............ 707/3 |
| 6,370,524 | B1 | | 4/2002 | Witkowski |
| 6,421,663 | B1 | * | 7/2002 | Chen et al. ............ 707/3 |
| 6,816,854 | B2 | * | 11/2004 | Reiner et al. ............ 707/3 |
| 2002/0032676 | A1 | * | 3/2002 | Reiner et al. ............ 707/3 |
| 2002/0198872 | A1 | * | 12/2002 | MacNicol et al. ............ 707/3 |
| 2003/0009446 | A1 | | 1/2003 | Agarwal et al. |
| 2003/0055814 | A1 | * | 3/2003 | Chen et al. ............ 707/3 |
| 2003/0074352 | A1 | | 4/2003 | Raboczi et al. |
| 2003/0084030 | A1 | * | 5/2003 | Day et al. ............ 707/3 |
| 2003/0163455 | A1 | | 8/2003 | Dettinger et al. |
| 2003/0217033 | A1 | | 11/2003 | Sandler et al. |
| 2003/0229640 | A1 | * | 12/2003 | Carlson et al. ............ 707/100 |
| 2004/0002961 | A1 | * | 1/2004 | Dettinger et al. ............ 707/3 |
| 2004/0044662 | A1 | | 3/2004 | Ganesan et al. |
| 2004/0073546 | A1 | * | 4/2004 | Turkel et al. ............ 707/5 |
| 2004/0078251 | A1 | * | 4/2004 | DeMarcken ............ 705/5 |
| 2004/0205078 | A1 | * | 10/2004 | Galindo-Legaria et al. .. 707/100 |
| 2005/0044064 | A1 | * | 2/2005 | Haase ............ 707/3 |
| 2005/0240577 | A1 | * | 10/2005 | Larson et al. ............ 707/3 |
| 2006/0074874 | A1 | * | 4/2006 | Day et al. ............ 707/3 |
| 2006/0218123 | A1 | * | 9/2006 | Chowdhuri et al. ............ 707/2 |

* cited by examiner

*Primary Examiner*—John Cottingham
*Assistant Examiner*—Sherief Badawi
(74) *Attorney, Agent, or Firm*—Sawyer Law Group LLP

(57) ABSTRACT

Processing non-Boolean term conditions in database queries. A query that is a request for data in a database is received and includes at least one uneven non-Boolean term condition that spans multiple tables in the database. The non-Boolean term condition is split into separate portions, each of the portions providing a Boolean term that can be satisfied by accessing one table in the database. The separate portions are executed independently to find at least one data result in the database that satisfies the Boolean term of each separate portion, and the data result from each separate portion are combined into a final result that satisfies the query.

15 Claims, 6 Drawing Sheets

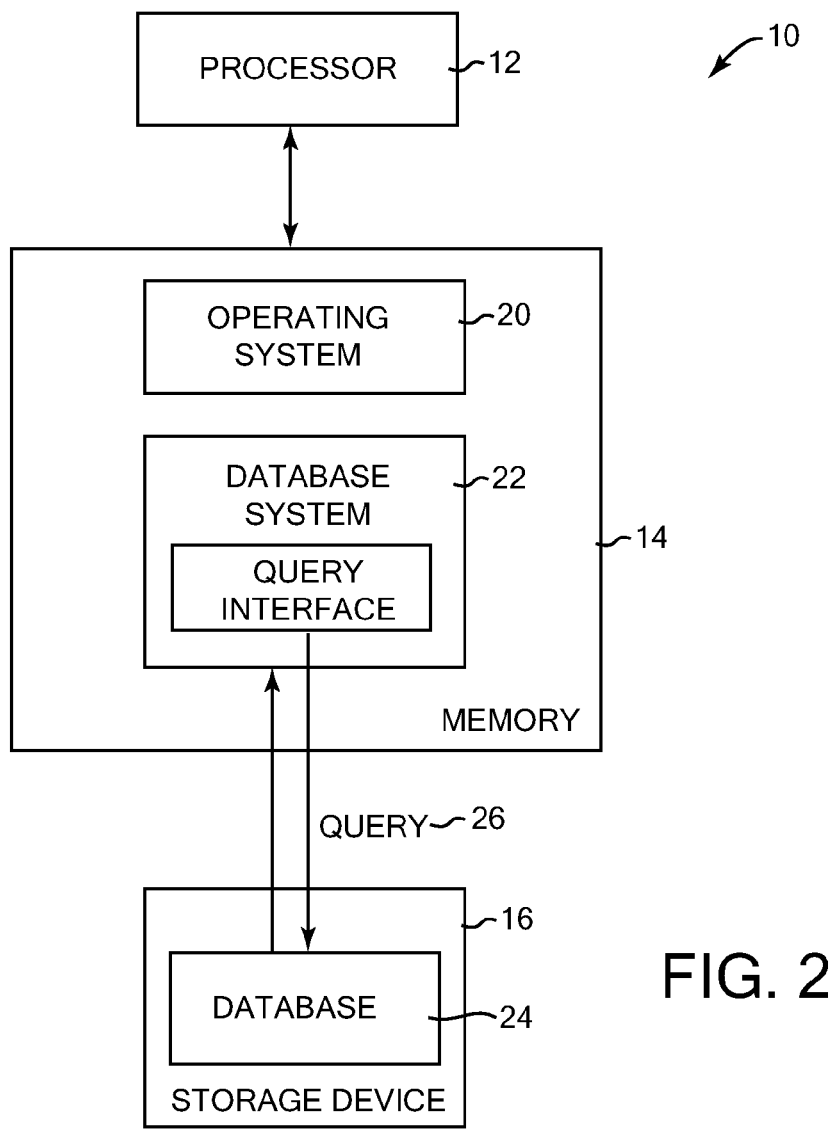

|  T1 |     |
| --- | --- |
| C2  | C1  |
| A   | 1   |
| A   | 2   |
| C   | 3   |
| D   | 4   |

|  TB |     |
| --- | --- |
| C1  | C2  |
| 1   | 1   |
| 2   | 2   |
| 3   | 3   |
| 4   | 4   |

|  T2 |     |
| --- | --- |
| C2  | C3  |
| 1   | 3   |
| 2   | 5   |
| 3   | 5   |
| 4   | 7   |

FIG. 3

|  T1 |     |
| --- | --- |
| C2  | C1  |
| A   | 1   |
| A   | 2   |
| C   | 3   |
| D   | 4   |

|  T2 |     |
| --- | --- |
| C2  | C3  |
| 1   | 3   |
| 2   | 5   |
| 3   | 5   |
| 4   | 7   |

FIG. 4

PROCESSING CROSS-TABLE NON-BOOLEAN TERM CONDITIONS IN DATABASE QUERIES

FIELD OF THE INVENTION

The present invention relates to database queries, and more particularly to processing non-Boolean term conditions across tables in database queries.

BACKGROUND OF THE INVENTION

Electronic databases provide extensive amounts of organized data that may be searched according to particular criteria to retrieve data pertinent to a requestor. Typically, the data is searched and retrieved using queries. Queries can be specified in different formats, according to the database query language that is being used. A query often includes one or more predicates, which are the parts of the query specifying a condition under which a statement is either true or false, and is thus used to specify conditions under which data is sought. The data in the database is typically organized in multiple tables, and is searched according to the conditions of the predicates.

Compound predicates allow multiple conditions to be specified, and may require that multiple tables of the database be searched. In particular, a compound OR predicate of a query that references more than one table requires that all predicates be evaluated as false before the entire compound OR predicate can be evaluated as false. For example, a query in Structured Query Language (SQL) format, including a compound OR predicate, is shown below:

SELECT *
FROM T1, T2
WHERE T1.C1=T2.C1
AND (T1.C2='A' OR T2.C3=5)

All data is selected to be searched from two tables, T1 and T2, the WHERE statement equates the C1 columns of the two tables T1 and T2, and the compound OR predicate is (T1.C2='A' OR T2.C3=5). This query thus indicates that the corresponding rows from both tables T1 and T2 should be provided as results to the query if either condition of the compound predicate is satisfied.

A typical process of implementing the query shown above is indicated diagrammatically in the table diagram of FIG. 1. Assuming T1 is the first table to be accessed in the join sequence, the first row of table T1 is retrieved, and the predicate T1.C2='A' is applied. The first row in T1 qualifies for this condition with the 'A' in column C2, and this row is joined to the first row of table T2 on the join column C1 so that the corresponding rows from both tables will be provided as results. Next, the second row of table T1 is retrieved, and the predicate T1.C2='A' is applied. The second row qualifies again with the 'A' value in column C2, and is joined to the second row of table T2 on the join column C1. (The second row also qualifies against the second predicate T2.C3=5, in column C3.) Next, the third row of table T1 is retrieved. The value at column C2 is not equal to 'A', but due to the OR condition the third row cannot be discarded and must be joined to the third row of table T2 to evaluate the second predicate T2.C3=5. The third row of table T2 qualifies for the second predicate condition due to the value 5 in column C3. Next, the fourth row of table T1 is retrieved. The value at column C2 is not equal to 'A', but again due to the OR condition the fourth row cannot be discarded and must be joined to the corresponding row in table T2 to evaluate the second predicate. The second predicate then also fails, and the fourth rows can thus be discarded. This same process continues for all rows of T1 (of which only four are shown in FIG. 1).

Thus, using this example compound predicate, all rows of table T1 must be accessed and all corresponding rows of table T2 must be joined to table T1 so that table T2 rows are either retrieved or checked, even if one or more rows are to be discarded. This is because there is no single Boolean term condition (such as an AND condition without OR conditions) that can qualify or disqualify rows from table T1 by accessing only table T1. A "non-Boolean" term, typically indicated by an OR condition, is present, and this non-Boolean term is fully uneven (herein referred to simply as "uneven"), meaning that the non-Boolean term spans multiple tables, i.e., data from (across) multiple tables must be checked against the non-Boolean condition to disqualify any rows This occurs, for example, when the term requires access to different tables based on predicates on opposite sides of an OR condition. Uneven non-Boolean terms can create a need for more table accesses and processing, and thus create longer access and processing times for queries.

Such uneven non-Boolean term are typically not a concern for searching small tables in a database, in which the extra accesses are not burdensome, or if the predicates are not very restrictive, when a majority of rows of the tables qualifies by accessing only one table. However, performance can degrade significantly as more tables are referenced by a compound predicate, or if the predicates are restrictive, and the tables involved in the query are large.

There are known ways to improve performance when the compound OR structure of a query contains predicates that can be isolated to a single table, allowing restrictive predicates to be applied as early as possible in the table join sequence. For example, if the predicate is of the form AND (T1.C2='A' OR T2.C3=5 AND T1.C2='B'), then the predicate AND (T1.C2='A' OR T1.C2='B') could be redundantly added so that it could be applied to T1 as this table is first accessed. Less disqualifying rows of T1 will thus need to be joined to table T2, since a row in table T1 can be qualified for either of the added predicate conditions before needing to join and access table T2. However, this solution does not resolve the problem when the OR branches are uneven, i.e., when the compound OR structure of a query contains predicates whose access spans multiple tables, as in the first example, above.

Accordingly, what is needed is an apparatus and method for easily improving the performance of queries including non-Boolean term conditions that require access to more than one table. The present invention addresses such a need.

SUMMARY OF THE INVENTION

The invention of the present application relates to processing non-Boolean term conditions in database queries. In one aspect of the invention, a method for searching for data in a database includes receiving a query that is a request for data in the database, the query including at least one uneven non-Boolean term condition that spans multiple tables in the database, splitting the non-Boolean term condition into separate portions, each of the separate portions providing a Boolean term that can be satisfied by accessing one table in the database, executing the separate portions independently to find data results in the database that satisfies the Boolean term of each separate portion, and combining the data results from each separate portion into a final result table that satisfies the query. Similar aspects of the invention provide a system and computer readable medium for implementing similar features.

In another aspect, a method for searching for data in a database includes receiving a query that is a request for data in the database, the query including at least one uneven non-Boolean term condition that spans multiple tables in the database, splitting the non-Boolean term condition into separate tasks, each of the separate tasks having a Boolean term that can be satisfied by accessing one table in the database, executing the separate tasks independently to find one or more rows in tables in the database that satisfies the Boolean term of each separate task, wherein the number of accesses to the tables is minimized, and combining the data results from each separate portion into a final result table that satisfies the query. Similar aspects of the invention provide a computer readable medium for implementing similar features.

The present invention provides a method for efficiently processing a query having uneven non-Boolean term conditions. One advantage is that minimal or reduced table accesses and joins are needed in comparison to prior implementations, thereby reducing processing time when filtering table rows within a database.

BRIEF DESCRIPTION OF THE FIGURES

FIG. 1 is a diagrammatic illustration of example tables used in a prior art method for query processing;

FIG. 2 is a block diagram illustrating a system suitable for use with the present invention;

FIG. 3 is a diagrammatic illustration of tables used in three-table examples of the present invention;

FIG. 4 is a diagrammatic illustration of tables used in two-table examples of the present invention;

DETAILED DESCRIPTION

Figure 5:
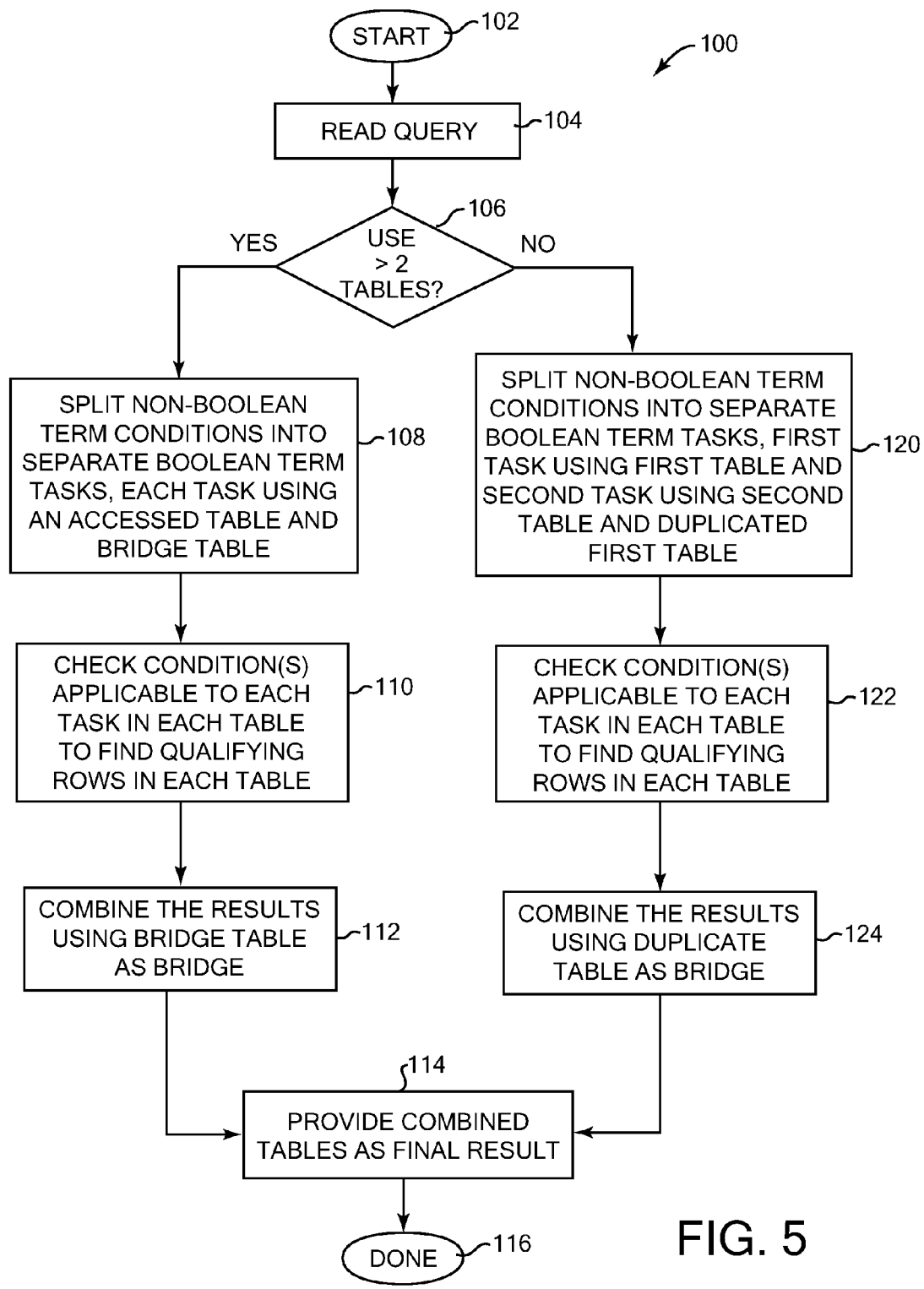
FIG. 5 is a flow diagram illustrating a method of the present invention for processing non-Boolean term conditions using separate tasks.

The present invention relates to database queries, and more particularly to processing non-Boolean term conditions in database queries. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system architectures usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 2 through 10 in conjunction with the discussion below.

FIG. 2 is a block diagram illustrating a computer system 10 suitable for use with the present invention. Computer system 10 can be any computer or electronic device suitable for implementing a database system, including one or more servers, desktop computers, laptop computers, portable electronic devices, or other devices. System 10 includes a processor 12, memory 14, and a storage device 16. Other peripheral devices or other components are usually included in, or in communication with, system 10 as is well known in the art, and are not shown in FIG. 2.

Processor 12 controls the operation of computer system 10 and can be implemented in any number of suitable forms, e.g., as one or more microprocessors or other integrated circuits. Processor 12 is in communication with memory 14, which may be implemented as a separate component within computer system 10 or can be integrated with processor 12. Memory 14 can be of any suitable type, including various types of random access memory (RAM) and/or read-only memory (ROM).

The memory 14 stores computer readable program instructions which can be loaded and implemented by the processor 12. One set of program instructions comprise an operating system 20, such as z/OS, AIX, UNIX, Windows, MacOS, etc., which typically is loaded into memory 14 during a start-up sequence. In operation, operating system 20 controls the execution of computer programs on the computer system 12. Another set of program instructions comprise a database system 22, which includes an interface to a database in communication with (or included in) the computer system 10. For example, database system 22 can include relational database software such as DB2 from IBM Corporation, or other software, and can include a structured query language (SQL) interface, which is an interactive query interface that provides queries to the database. Users of the database system 22 can search for information by inputting a query, which requests a set of information from the database that satisfies the criteria set out in the query. In an SQL embodiment, the query includes SQL commands and syntax. Other types of database syntax can be used in other embodiments. The database system 22 can perform front end processing on the query, which parses the query for syntax errors, identifies and verifies the areas of the database to search. Furthermore, the query may be processed into a different form for more efficiency, if appropriate.

Storage device 16 is in communication with the database system 22 running on the computer system 12, and can be any of a variety of devices used for storing data, including memory, hard disk(s), floppy disk(s), CD-ROM, DVD-ROM, or other optical storage, tape drive(s), or other device. The storage device 16 may be included in the computer system 10 or coupled to the computer system 10 via a communication link. A database 24 is provided on the storage device 16, which can be a relational database that stores data organized into tables and indexes for use with the database system 22 running on the computer system 10. The database system 22 has read access and (in some cases) write access to the data in the database 24. Alternatively, all or part of the database 24 can be stored within memory 14, i.e., memory 14 acting as the storage device 16.

A query 26 (or the equivalent request) can be provided to the database 24 to retrieve data that meets the criteria of the query. Such data is returned to the database system 22 for display and/or manipulation by the requester.

Processing Non-Boolean Term Conditions

The present invention decreases the amount of table accessing and processing needed when satisfying a query that has uneven non-Boolean term conditions, e.g. when rows are filtered from tables in the database which qualify under OR conditions spanning multiple tables. This is accomplished, in general terms, by splitting the non-Boolean term condition(s) into separate query blocks or tasks that are processed independently. The result of each independent block or task is then merged together to produce the final result.

The invention is described below according to two different embodiments: separate tasks and UNIONed query blocks. These embodiments reference two examples of data tables stored in the database 26, as shown in the diagrammatic illustrations of FIG. 3 and FIG. 4. Data groupings other than tables can be used in alternate embodiments, but are all referred to as "tables" herein.

FIG. 3 shows three tables T1, TB, and T2, which are used for the three-table examples in the different embodiments of the invention. Table T1 has columns C1 and C2, table T2 has columns C2 and C3, and table TB (a bridging table) has columns C1 and C2. Tables T1 and T2 are accessed based on an uneven non-Boolean condition (as in the example below), while table TB is a table that includes the columns C1 and C2 and may include other data columns (not shown), but is not accessed or referenced based on the non-Boolean condition.

It should be noted that these tables are simple examples for illustrating the present invention, and that different numbers and sizes of tables can be used with the present invention. For example, there can be a query that accesses 10 tables, with some of the tables involved in the uneven non-Boolean condition, one or more of the tables used as a bridge table TB, and the other tables accessed to retrieve corresponding rows.

A query example that is referenced throughout the specification which accesses the tables shown in FIG. 3 for a three-table process is Query 1, below in SQL format:

QUERY 1
SELECT *
FROM T1, TB, T2
WHERE T1.C1=TB.C1
AND TB.C2=T2.C2
AND (T1.C2='A' OR T2.C3=5)

The uneven non-Boolean condition is the OR condition in the last line of the example.

FIG. 4 shows two tables T1 and T2 which are used for the two-table examples in the different embodiments of the invention. Table T1 has columns C1 and C2 and table T2 has columns C2 and C3, similar to the tables T1 and T2 of FIG. 3. There is no bridging table TB for this example. Tables T1 and T2 are accessed based on an uneven non-Boolean condition (as in the example below).

A query example that is referenced throughout the specification which accesses the tables shown in FIG. 4 for a two-table process is Query 2, below in SQL format:

QUERY 2
SELECT *
FROM T1, T2
WHERE T1.C1=T2.C1
AND (T1.C2='A' OR T2.C3=5)

The uneven non-Boolean condition is the OR condition in the last line of the example.

Separate Tasks Embodiment

FIG. 5 is a flow diagram illustrating a method 100 for processing uneven non-Boolean term conditions using separate tasks. Method 100, and the other methods described herein, can be implemented by program instructions of software, such as in database system 22 as shown in FIG. 2. The program instructions can be stored on a computer readable medium, such as memory, hard drive, other magnetic disk, optical disk (CD-ROM, DVD-ROM), etc. Alternatively, some or all of method 100 (and other methods herein) can be implemented using hardware (logic gates, etc.), or a combination of software and hardware.

The method begins at 102, and in step 104, the query input by the user (or program, etc., also referred to herein as a "user") is read by the database system 22. The query parser detects one or more non-Boolean term conditions that span multiple tables, so that the separate tasks process of the present invention is used. In step 106, it is determined whether greater than two tables are to be used to satisfy the non-Boolean condition(s) according to the present invention, or whether two tables are to be used. As shown above in the example of FIG. 3, a three-table process is possible when a third table, TB, exists in the database and is used in the query. The third table is not needed to fulfill the non-Boolean condition and has at least one column from the other two tables that need to be accessed. Such "linking" tables are common in databases. It is also possible that the bridging comprises more than one table. If no such bridging table is used in the query, then only the two tables that need to be accessed for the condition are used (see step 120).

If three or more tables are to be used, the process continues to step 108, in which the non-Boolean term condition(s) of the query are split into separate Boolean term tasks, each task separately accessing a different table, and each task including the bridging table(s). Each different predicate in each uneven non-Boolean condition is provided to a different task. Thus, the number of tasks depends on the number of uneven non-Boolean term predicates in the query.

Figure 6:
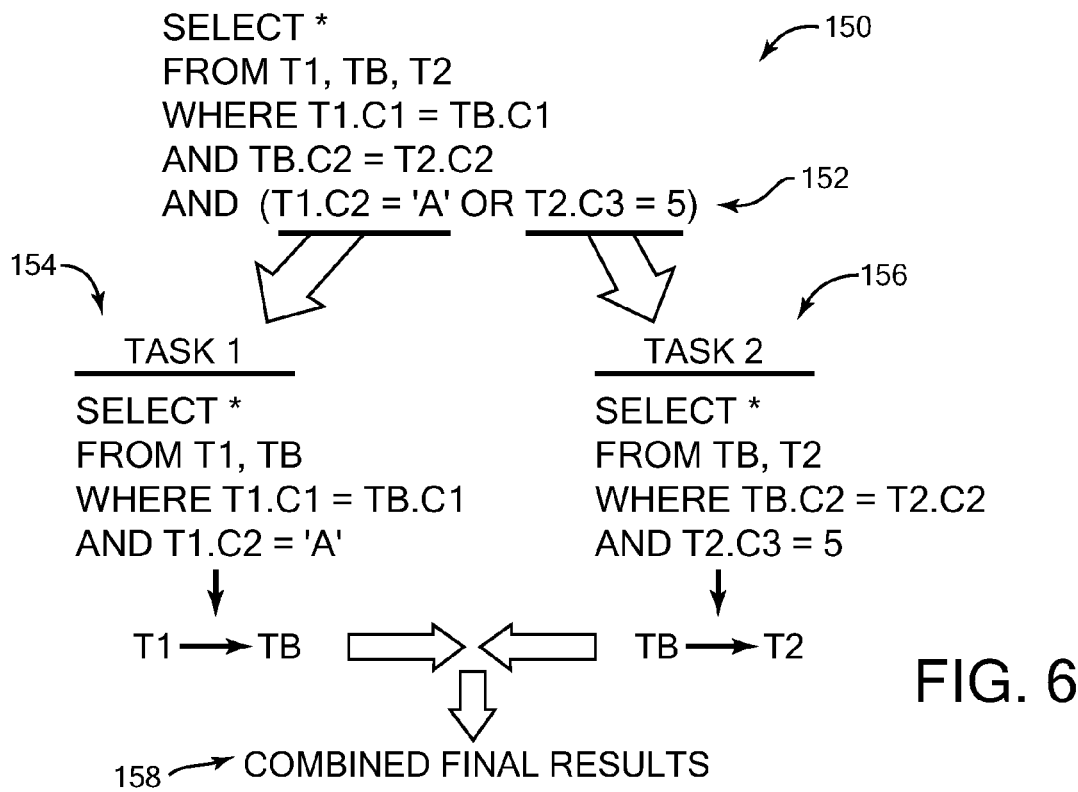
FIG. 6 is a diagrammatic illustration of a three-table example query being split into separate tasks according to the method of FIG. 5.

FIG. 6 is a diagram 150 illustrating the splitting of a non-Boolean condition into separate tasks, using an example in which three tables are used. The uneven non-Boolean term condition 152 is split into Boolean condition task 154 and Boolean condition task 156. Each task is a separate task for the process to execute (simultaneously or sequentially), where each of the Boolean condition tasks includes the use of the third table TB and one of the tables that needs to be accessed for the OR condition (T1 or T2).

As shown in the example of FIG. 6, the first side (predicate) of the OR condition 152, T1.C2='A', is used in the Boolean task 154 in which the columns C1 from tables T1 and TB are set equal to each other. There is no OR condition referencing two tables in task 154; it is a Boolean condition task that need only access one table, T1. Likewise, the second side (predicate) of the OR condition 152, T2.C3=5, is used in the Boolean task 156 in which the columns C2 from tables T2 and TB are set equal to each other. There is no OR condition accessing two tables in task 156; it is a Boolean condition task that need only access one table, T2.

Preferably, the maximum number of tasks created in step 108 should not be more than the number of tables involved in the query. This is so that the processing of separate tasks does not become too burdensome for the system. In many cases, the number of tasks can be reduced to a number fewer than the number of involved tables. In some embodiments, a query, that includes many more predicates than tables in an uneven non-Boolean condition, can be rewritten so that the predicates are grouped to provide a lower number of tasks. Minimizing tasks and consolidating predicates is described in greater detail below.

Referring back to FIG. 5, in step 110, the process checks the conditions applicable to each task to find the qualifying rows in each table. The process can access a table (or an appropriate index, if available) to check the column that is being used to satisfy the condition in each table to determine which rows of the table are to be included in the result. For example, with reference to FIG. 6, in Boolean task 154 the process checks the column C2 of table T1 to determine if the value in each row of column C2 is equal to "A." If using the tables of FIG. 3, the process would determine that rows 1 and 2 of column C2 of table T1 satisfy the condition of column C2 being equal to "A" and are the results. Similarly, in the other Boolean task 156 of FIG. 6, the process would check the column C3 of table T2, and would determine (as shown in FIG. 3) that rows 2 and 3 of column C3 of table T2 satisfy the condition of column C3 being equal to "5."

Thus, by splitting the non-Boolean term conditions into separate Boolean term tasks, only those rows qualifying from either table will be accessed, allowing the filtering of the qualifying rows to take place without having to join disqualified rows from the multiple tables. If the non-Boolean conditions are not split, then all rows from all three tables T1, T2, and TB must be accessed and joined before any row can be disqualified, since rows from both table T1 and table T2 are needed to evaluate the OR condition.

In step 112 of FIG. 5, the results of the different tasks (which can be considered tables) are combined using the table TB as the bridge or intersection point. The combining can be performed using the equivalent operation to a UNION operation, for example. The results from step 110 are the rows that qualified for the condition under each task. The shared column between the bridge table TB and each other table allows the resulting rows from each task to be corresponded and combined into a final resulting table. For example, with reference to FIGS. 3 and 6, the rows 1 and 2 of table T1 satisfied the Boolean condition of task 154, and the rows 2 and 3 of table T2 satisfied the Boolean condition of task 156. These results are combined, e.g., with a UNION-type operation, resulting in a combined table of rows 1, 2, and 3 (row 2 was found by both tasks, and so the duplicate is discarded, e.g. during the task itself or after a sort operation after the combination).

It should be noted that combining step 112 also usually includes a final join of any corresponding rows of the different tables which are required by the original query to be accessed, but which were not provided by the separate tasks. Thus, in the example of FIG. 6, after the results of the two tasks 154 and 156 are merged, then the rows of tables T1 or T2 which correspond to the found rows from the separate tasks, but which were not found in the tasks, are joined so that all the rows from the needed tables can be provided as the query results. In some instances, joins are performed to rows from tables which were not in the non-Boolean condition (and thus not needed in the separate tasks) but which are needed to satisfy the query. In still other embodiments or instances, a final join operation may not be needed, for example, if all information required by the query is retrieved from the separate tasks.

It should be noted that in other examples, several bridge tables may be used or needed to complete the bridge between the tables used in the non-Boolean condition and separated by the tasks. For example, an original query may access five tables, where two of those tables are used in the non-Boolean condition and in each task, and where the other three tables form a complete bridge between the task tables only by referencing the task tables and each other. Similarly, other examples may include the non-Boolean and bridge tables as a subset of the entire query. For example, an original query may access ten tables, where two of those tables are used in the non-Boolean condition, three tables form the bridge, and the remaining five tables are joined but do not form part of the non-Boolean term bridge. In this case, the additional tables do not need to participate in the separate tasks, and may be joined in the final steps. Alternatively, filtering tables not participating in the non-Boolean conditions may be included in the separate tasks to take advantage of their early filtering.

In step 114, the combined table is provided as a final result in response to the original query, and the process is complete at 116.

Figure 7:
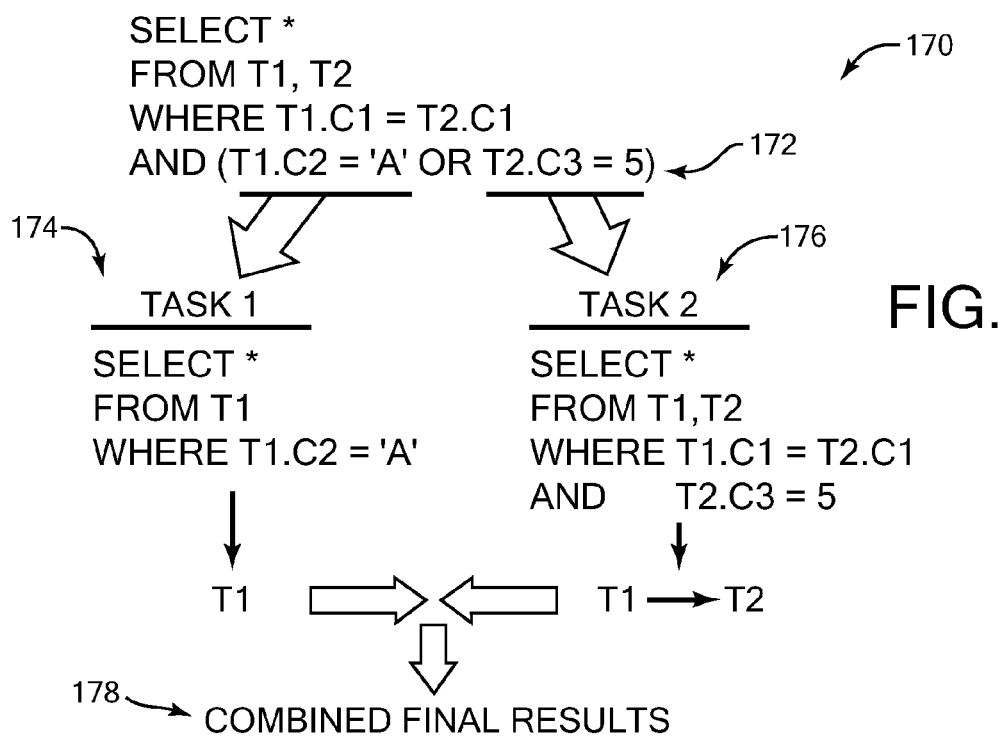
FIG. 7 is a diagrammatic illustration of a two-table example query being split into separate tasks according to the method of FIG. 5.

If in step 106 it is determined that two tables are to be used to satisfy the query according to the present invention, then the process continues from step 106 to step 120. FIG. 7 is a diagram 170 illustrating the splitting of an uneven, non-Boolean condition 172 of a query into separate tasks, using an example in which two tables are used. In the two-table process, no existing bridging table TB is used, and a bridging table is created.

In step 120, uneven non-Boolean term conditions in the query are split into two separate Boolean term tasks, each non-Boolean predicate used in a different task. A first task uses the first table, and a second task uses the second table and a duplicated first table as the bridge table. Since no third (or fourth, etc.) table is used as the bridge table, the duplicated first table can serve as the bridge or intersection point for the two tables. In an alternate embodiment, the first table is not duplicated, and the second table is duplicated and used in the first task as the bridge table. In some embodiments, these two approaches can be analyzed by the process to determine which table should be duplicated to achieve the most efficient processing that saves number of accesses/joins and processing time. Although the second task includes two tables, it is checking the second table for satisfying the condition, and is using the first table as a reference so that the results of the separate tasks may later be joined.

For example, in FIG. 7, the first side of the non-Boolean OR condition 172, T1.C2='A', is used in the first Boolean task 174 in which only table T1 is accessed. There is no OR condition referencing two tables in task 174; it is a Boolean condition task that is only interested in accessing one table, T1. Likewise, the second side of the OR condition 172, T2.C3=5, is used in the Boolean task 176 in which the column C1 from tables T2 and T1 are set equal to each other, and there is no OR condition requiring access of two tables in task 176.

Referring back to FIG. 5, in step 122, the process checks the conditions applicable to each task to find the qualifying rows in each table. The process can access a table (or index) to check the column that is being used to satisfy the condition in each table to determine which rows of the table are to be included in the result. For example, with reference to FIG. 6, in Boolean task 174 the process checks the column C2 of table T1 to determine if the value in each row of column C2 is equal to "A." Using the tables of FIG. 4, the process would determine that rows 1 and 2 of column C2 of table T1 satisfy the condition of column C2 being equal to "A" and are the results. Similarly, in the other Boolean task 176 of FIG. 6, the process would check the column C3 of table T2, and would determine that rows 2 and 3 of column C3 of table T2 satisfy the condition of column C3 being equal to "5." The task 176 need only access table T2 to determine which rows of T2 fulfill the second side of the condition 172, and need not access the duplicate table T1 for this condition.

In step 124 of FIG. 5, the results of the different tasks are combined using the duplicate first table T1 as the bridge. The combining can be performed using an equivalent operation to a UNION operation, for example. The results from step 122 are the rows that qualified for the condition under each task. The shared column between the table T1 of the first task and the duplicate table T1 of the second task allows the resulting rows from each task to be combined into a final resulting table. For example, with reference to FIGS. 3 and 6, the rows 1 and 2 of table T1 satisfied the Boolean condition of task 174, and the rows 2 and 3 of table T2 satisfied the Boolean condition of task 176. These results are combined, e.g., with a UNION type operation, resulting in a combined table of rows 1, 2, and 3 (row 2 was found by both tasks, and so the duplicate is discarded, e.g. during the task itself or with a sort operation after the combine). As in step 112 above, this combining step may often include a final join operation to any rows from tables needed for the query result, such rows not having been retrieved from the tasks 174 and 176.

In next step 114, the combined table is provided as a final result in response to the original query, and the process is complete at 116.

The advantages of the separate tasks embodiment are even more clearly evident in an example having tables with many rows, such as hundreds or thousands. If only a very few rows qualify under the non-Boolean conditions, the present invention need only join to T1 those few corresponding rows from T2 in which the conditions are satisfied; the process does not need to join every corresponding row of T2 to T1 in order to check whether the rows qualify.

Figure 8:
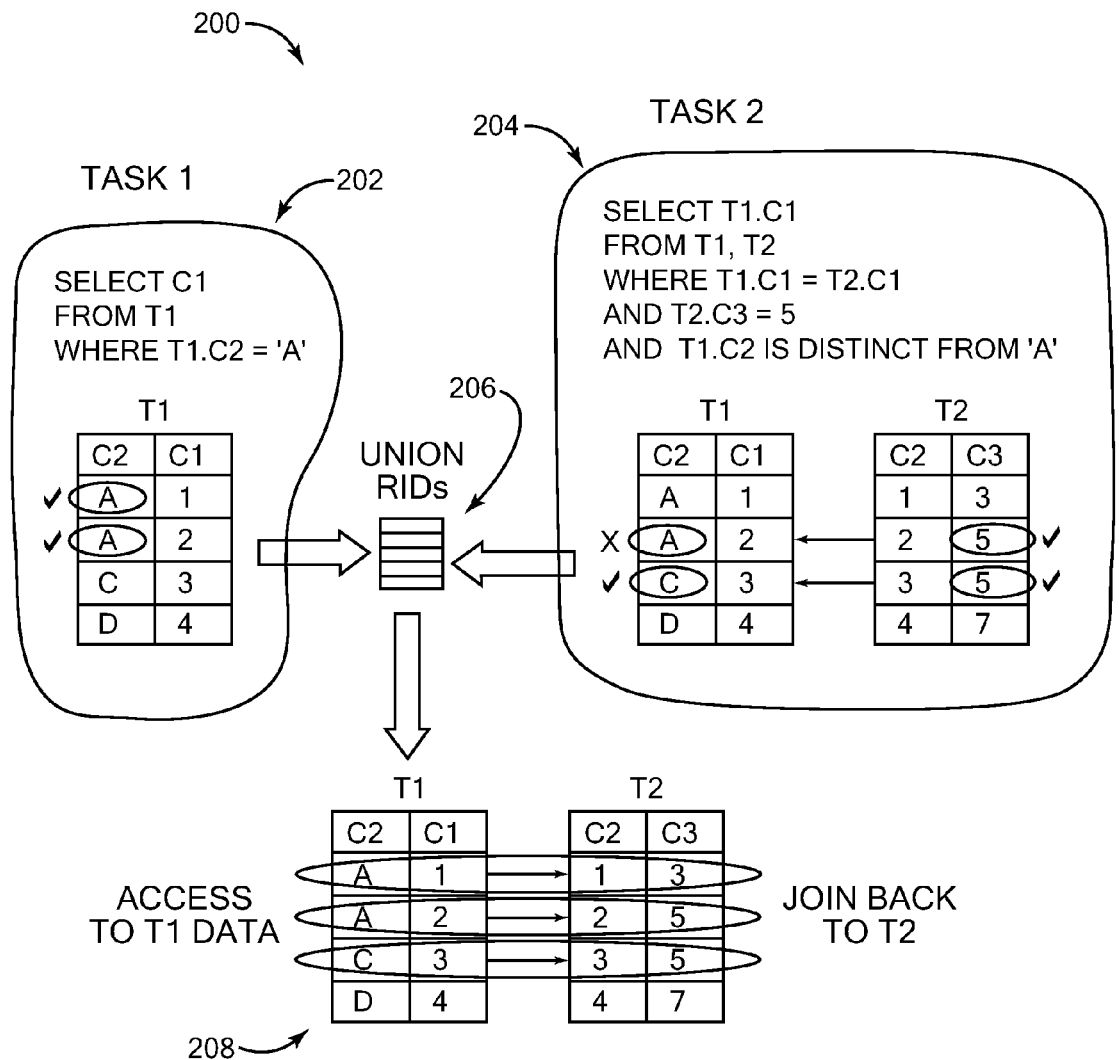
FIG. 8 is a diagrammatic illustration of the separate tasks of FIG. 5 being used with an index to a database.

FIG. 8 is a diagrammatic illustration of another example 200 for step 120 of FIG. 5, in which a query having a non-Boolean condition is split into two separate Boolean tasks, using two tables. In this example, the database system 22 can use indexes to access tables in the database, and thus step 120 can use record IDs (RIDs) in the splitting process. As is well known to those skilled in the art, database indexes are an ordered set of pointers to data records in tables. In some cases, the information requested by a query can be satisfied by the index so that the tables need not be accessed. The index has key entries, and RIDs which are a pointer to a database record in a table, the database record having key column values equal to the key. The record ID thus acts as an address for a particular row in a table.

In FIG. 8, task 202 (task 1) and task 204 (task 2) have been split from a single uneven non-Boolean condition in a query, similar to the example as shown above in FIGS. 4 and 7, and using the same OR condition and tables. Thus, in task 202, one or more indexes are preferably accessed to find the first and second rows that satisfy the Boolean condition "T1.C2='A'," and in task 204, the index is preferably accessed to find the second and third rows that satisfy the Boolean condition "T2.C3=5." Table T1 is used in task 2 as the bridge between tasks. Since the index in task 202 include the values which are to be checked under the Boolean condition, the index saves accesses to the tables T1 in this task. Avoiding access to tables T1 and T2 is task 204 is dependent on available indexes. Restrictions to such index-only accesses are discussed in greater detail below. Three-table, or other multi-table, queries can also use indexes in a similar way to reduce table accesses.

In addition, task 204 includes a predicate of "T1.C2 IS DISTINCT FROM 'A.' The "IS DISTINCT FROM" clause causes the database process to not include in the results any row that meets the condition specified in the predicate, and thus allows the process to remove duplicates from the final result set. When using two tables as shown, the DISTINCT clause should specify the condition used in the first task 202. In this example, any qualified row under column T2.C3 which also has a qualified value ("A") in column C2 of table T1 is discarded, since that would be a duplicate row from task 1 which is specifically seeking rows with that condition. When the results of tasks 202 and 204 are combined, the duplicates will thus have already been removed within task 204. The DISTINCT clause in this example is equivalent to "T1.C2<>'A' OR T1.C2 IS NULL." In alternate embodiments, task 204 does not use the "distinct from" operation nor performs any other duplicate row removal; rather, after the tasks combine their results, a sort can be performed and duplicate rows removed at that time.

The results of tasks 202 and 204 are combined by building combined record ID (RID) list 206 after a UNION ALL (or UNION, or equivalent) operation of the results from each task 202 and 204. A list of record IDs is produced from task 202 for table T1, indicating which rows in table T1 have met the conditions in task 202. Task 204 also produces a list of RIDs of rows in table T1 which have met the conditions in task 204. The RIDs from task 202 and task 204 are merged together into the list 206. Duplicates can be removed at this point (after the list 206 is sorted), if the duplicates have not been removed using a "distinct from" or similar operation in one of the tasks 202 or 204.

As shown in tables 208, the combined RID list 206 is then used by the process to access the rows of T1 in the list 206 (as shown by the circled rows in FIG. 8), and the corresponding rows of table T2 are then joined to the accessed rows of T1. Since the accessed and joined rows of tables T1 and T2 are based only on the RID list 206, all rows satisfy the original non-Boolean condition and there are no wasteful accesses of rows that do not qualify at all, e.g., in the example of FIG. 8, the fourth row of tables T1 and T2 is never accessed.

The presence of indexes in the database system which can be used for the local or join predicates between tables will determine how the independent table accesses will occur, and also whether a join back of rows from different tables is required. A final join step is not required to all tables, for example, if all required information is retrieved from the separate tasks. In FIG. 8, it is only possible that T1 access in 208 could be avoided if all required information for T1 was retrieved from 202 and 204. Index-only access, i.e., checking conditions for a table using the index without needed to access a table directly, can be exploited, if possible, for the building of the combined RID list 206 from each separate Boolean task.

In the example of FIG. 8, index-only access is possible for the RID list provided from task 204 if an index exists on the local predicate column C2 of table T1. If an index exists only on column C1 of table T1, then the duplicate-removal predicate on C2 (i.e., T1.C2 IS DISTINCT FROM 'A') can be discarded in favor of a sort to remove any duplicate RIDs produced. Index-only access to table T2 is possible if an index exists on column C3 and column C1. An index referencing only column C3 would require index access and direct access to table T2 to retrieve the values of column C1 for the join to T1.

The separate tasks embodiment described above tends to be a very efficient process, since the database software itself executes at runtime in a way to achieve the splitting of the non-Boolean condition into Boolean conditions of the present invention without any pre-processing of the query required. Thus, no re-write of the query is needed.

In some implementations of database processor, having queries in particular forms may be more efficient when executing a process to achieve the separate tasks embodiment. For example, it may be advantageous for some database process implementations to rewrite the original query in a different form, called disjunctive normal form. In general terms, an original query is rewritten in disjunctive normal form by creating a compound predicate, which is a Boolean term, on each side of the OR statement.

For example, the original three-table Query 1 presented above would be written as the following Query 3 in disjunctive normal form:

QUERY 3
SELECT *
FROM T1, TB, T2
WHERE (T1.C1=TB.C1 AND TB.C2=T2.C2 AND T1.C2='A')
OR (T1.C1=TB.C1 AND TB.C2=T2.C2 AND T2.C3=5 AND T1.C2 IS DISTINCT FROM 'A')

The original two-table query Query 2 presented above would be written as the following Query 4 in disjunctive normal form:

QUERY 4
SELECT *
FROM T1, T2
WHERE (T1.C1=T2.C1 AND T1.C2='A')
OR (T1.C1=T2.C1 AND T2.C3=5 AND T1.C2 IS DISTINCT FROM 'A')

The compound predicate within each OR branch becomes a Boolean term. Each Boolean term branch is independently executed in its entirety, without reference to the other branch, as described above.

UNION Rewrite Embodiment

In the separate tasks embodiment described above, no re-write of the query is needed since the database processor executes the embodiment at runtime. However, there are some drawbacks with the separate tasks embodiment. For example, database software and query search methods must be modified to perform the splitting and processing operations of the present invention, which has a cost in time and effort in the additional creating and/or modifying of database software code.

In contrast, the UNION rewrite embodiment rewrites the original query in an alternative form that effectively causes the splitting of one or more non-Boolean conditions into separate Boolean tasks without having to modify the runtime process of the database software. The modification of the code can be performed automatically, by a query processing front-end, and the modified query can be provided to standard database query software to perform the query search.

Figure 9:
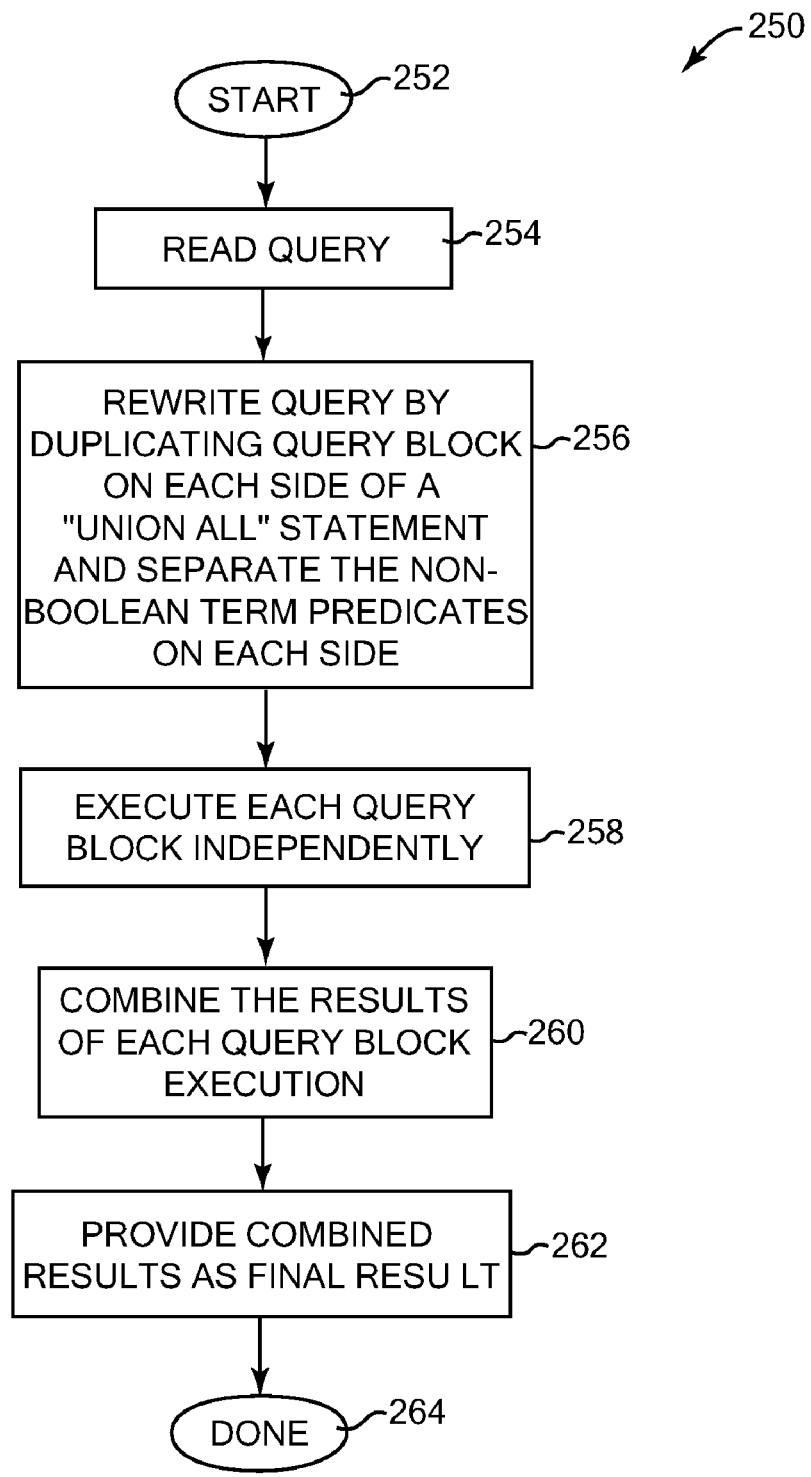
FIG. 9 is a flow diagram illustrating a method of the present invention for processing non-Boolean term conditions using a union rewrite embodiment.

FIG. 9 is a flow diagram illustrating a method 250 for bridging non-Boolean term conditions using a union all embodiment. The method begins at 252, and in step 254, the query input by the user is read by the database system 22. This query can include references to three (or more) tables, as in FIG. 3 and similar to FIG. 6, or can include references to only two tables, as in FIG. 4 and similar to FIG. 7. In either case, the same steps are used, as described below.

In step 256, the original query is rewritten by duplicating a query block on each side of a UNION-type statement, and separating the predicates of the uneven non-Boolean term condition on each side so that each query block has a different Boolean condition. The "UNION-type" statement is a UNION, UNION ALL, or similar type of query statement which joins combines results of multiple queries. Each query block thus provides a Boolean term. For example, using Query 1 as provided above using three tables, this query would be rewritten as follows with a UNION ALL statement:

SELECT *
FROM T1, TB, T2
WHERE T1.C1=TB.C1
AND TB.C2=T2.C2
AND T1.C2='A'
UNION ALL
SELECT *
FROM T1, TB, T2
WHERE T1.C1=TB.C1
AND TB.C2=T2.C2
AND T2.C3=5
AND T1.C2 IS DISTINCT FROM 'A'

The query block is the same on either side of the UNION ALL statement, except that the T1.C2='A' part of the non-Boolean condition is in the first block, while the T2.C3=5 part is in the second block. The OR condition has been eliminated to create the Boolean terms.

This example also includes the condition, "T1.C2 IS DISTINCT FROM 'A'." Similarly to the example of FIG. 8 described above, this predicate ensures that duplicate rows between the two query blocks are removed from the second block, since the UNION ALL operation does not remove such duplicates. In other embodiments, e.g., in complex generated predicates where the addition of the "DISTINCT FROM" condition is not as straightforward, a UNION (or equivalent) statement can be used in place of UNION ALL, where the UNION statement operates to automatically remove duplicates, and the "DISTINCT FROM" condition would thus be no longer needed.

Using Query 2 as provided above using two tables, the rewritten query would appear as follows:

SELECT *
FROM T1, T2
WHERE T1.C1=T2.C1
AND T1.C2='A'
UNION ALL
SELECT *
FROM T1, T2
WHERE T1.C1=T2.C1
AND T2.C3=5
AND T1.C2 IS DISTINCT FROM 'A'

As with the three-table rewritten query, the query block is the same on either side of the UNION ALL statement, except that the T1.C2='A' predicate of the non-Boolean condition is in the first block, while the T2.C3=5 predicate is in the second block. The OR condition has been eliminated to create the Boolean terms. Thus, there is no OR condition referencing two tables in the first query block, and the block need only access one table, T1, to filter rows. Likewise, the second query block on the other side of the UNION ALL statement need only access one table, T2, to filter rows. If the original query includes more than two predicates in the uneven non-Boolean condition, then each predicate is provided in a query block separated by another UNION-type statement, so that each query block has only Boolean terms.

The rewriting of the original query into the query blocks shown above is performed by the query parser/processor of the database system 22. For example, a query parser analyzes an original query to find uneven non-Boolean conditions such as an OR statement surrounded by predicates that access different, multiple tables. The query processor then decides on a table to act as a bridge table, which can be either a third table as in the FIG. 3 example, or one of the tables used in the non-Boolean condition, as in the example of FIG. 4 (also, in the two-table case of FIG. 4, the query processor can evaluate each table as the bridge table and choose to duplicate the table which provides the most efficient process). In the rewritten query, the different predicates can be split into query blocks surrounded by the UNION-type statement, while repeating the rest of the query in each block.

In step 258, each Boolean query block is independently executed, without reference to the other query block. This independent execution is required by the operation of the UNION-type statement, which produces a result table that has all rows combined from two input tables resulting from separate query operations on base tables. During block execution in step 258, the process checks the conditions applicable to each block in the table of each block to find the qualifying rows in each table.

In step 260, the results of each query block execution are merged together with the UNION-type operation. The result from step 260 is a table having the combined rows that qualified for the condition under each query block. The shared columns between the tables allow the resulting rows from each branch to be combined into the final resulting table. In step 262, the combined results are presented as the final results to the original query, and the process is complete at 264.

In the UNION rewrite embodiment, index-only access can be used when the database implementation allows it, as described above with reference to the embodiment of FIG. 8.

The UNION rewrite embodiment allows a database process to perform its normal runtime execution to achieve a splitting of non-Boolean conditions into different Boolean conditions and executing the Boolean conditions. However, the UNION rewrite process is less efficient than the separate tasks embodiment; one reason for this is that each query block on each side of the UNION-type statement must access all the tables in the query to retrieve the rows that qualify for that block's condition. If there are many tables, this can create many redundant table accesses. In contrast, in the separate tasks embodiment, each task need only access the tables required to achieve a bridge, i.e., the separate tasks embodiment minimizes the number of table accesses when processing an uneven non-Boolean term condition.

Minimizing the Number of Query Blocks or Tasks

Additional steps in the embodiments above can be taken to reduce the amount of different tasks or blocks that must be independently executed according to the present invention. The less non-Boolean conditions are present in the term, the less amount of tasks that need to be independently executed, thereby saving processing time.

The original query can be analyzed by the database query parser/processor to determine whether the uneven non-Boolean term can be simplified or reduced based on known logic and simplification rules. For example, this query task/block minimization step can be taken after step 104 in the method of FIG. 5, or after step 254 or step 256 in the method of FIG. 9.

One step that can be taken to minimize the number of query blocks that are generated in the present invention is to make particular non-Boolean term predicates be ineligible for task splitting. For example, a simple or compound predicate can be removed if it is subsumed by another predicate. As an example, (T1.C1=10 OR (T1.C1=10 AND T2.C2=20)) can be simplified to (T1.C1=10). Also, redundant predicates can be removed. As an example, (T1.C1=10 OR T2.C2=20 OR T1.C1=10) can be simplified to (T1.C1=10 OR T2.C2=20).

In addition, predicates can be localized through predicate transitive closure. An example query is provided below:

WHERE T1.C1=T2.C1
AND (T1.C2='A' OR T2.C1=5)

Through transitive closure, the predicate on T2.C1 can be transposed to T1.C1, so that the non-Boolean term condition becomes AND (T1.C2='A' OR T1.C1=5). This non-Boolean term condition no longer crosses the "table boundary," i.e. it references only one table (T1), and therefore does not require additional query blocks to be generated.

Another step that can be taken to minimize the number of tasks or branches is that predicates can be localized to each table so that the number of query tasks or blocks equals the number of tables in which the non-Boolean term predicates exist. As an example, the term (T1.C1=10 OR T2.C2=20 OR T1.C1=5) can be written as (T1.C1 IN (5,10) OR T2.C2=20), where the IN condition checks whether the T1.C1 value is 5 or 10. Similarly, the term (T1.C1=10 OR T2.C2=20 OR T2.C3='A') can be written as (T1.C1=10 OR (T2.C2=20 OR T2.C3='A'), where one query block or task is generated for the single predicate on table T1, and another query block or task is generated for the compound predicate on table T2. A single query block or task can therefore contain non-Boolean term predicates provided that these predicates all reference a single table. Thus, standard index OR'ing can be used within the one query block or task to access this table.

Another step that can be taken to minimize the number of tasks or branches is that any table or column that exists in all OR branches can be localized out so that it may minimize the need to create additional query blocks or tasks. As an example, the term (T1.C1=5 OR (T1.C1=10 AND T2.C2=20) OR (T1.C1=15 AND T3.C3='A')) has the table and column T1.C1 in every condition between the OR statements, which can be localized out to a redundant Boolean term condition AND T1.C1 IN (5, 10, 15). The entire condition becomes: T1.C1 IN (5, 10, 15) AND (T1.C1=5 OR (T1.C1=10 AND T2.C2=20) OR (T1.C1=15 AND T3.C3='A')).

Optimization

The embodiments of the present invention, as well as previously-known methods, can be compared and evaluated prior to executing a query search to determine the most optimal method for a particular application. The separate tasks embodiment of the present invention, for example, can be costed using known costing methods and compared with a cost analysis of an original, previously-used access method that is unable to filter out the matching rows until all referenced tables are joined and the predicates are available. The lowest cost method can be chosen based on the comparison. In some cases, e.g., with small tables, non-restrictive predicates, or when little filtering of rows is needed, the original method might be sufficient. In contrast, very selective predicates and significant filtering of rows, and/or large involved tables, can benefit greatly from the access paths of the separate tasks embodiment. In other applications instances, the UNION rewrite embodiment may provide the desired increase in performance with a decreased requirement for time and cost of implementation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for searching for data in a database, the method comprising:
   receiving a query that is a request for data in the database, wherein the query identifies multiple tables in the database, the query including at least one uneven non-Boolean term condition including an OR condition having two predicates, wherein the OR condition spans and is satisfied by at least two tables of the multiple tables;
   splitting the at least one non-Boolean term condition into a plurality of separate query portions, wherein each predicate of the OR condition is provided to a different one of the separate query portions, each of the separate query portions providing a Boolean term that is satisfied by accessing a different particular one of the at least two tables;
   executing the separate query portions independently of each other to find at least one data result in each of the at least two tables that satisfies the Boolean term of each separate query portion, wherein a duplication of accesses to the different particular tables is minimized in the execution of the separate query portions, and wherein every corresponding row of the different particular tables does not need to be joined in order to check whether the corresponding rows satisfy the non-Boolean term condition;
   identifying at least one bridge table, the at least one bridge table being at least one of the multiple tables which does not satisfy the at least one uneven non-Boolean term condition and has at least one column from each of the different particular tables; and
   combining the data result from each separate query portion into a final result that satisfies the query, wherein the at least one identified bridge table is used to join each of the different tables to combine the data results.

2. The method of claim 1 wherein the data results include rows in a table found from the execution of the separate query portions, and wherein rows duplicated between the data results from the separate query portions are removed from one of the data results.

3. The method of claim 1 further comprising rewriting the query before splitting the non-Boolean term condition into separate query portions, such that the number of separate query portions needed to be executed is reduced.

4. The method of claim 1 wherein the separate query portions are separate tasks, each task being executed independently at runtime to find the data results for the Boolean term associated with that task.

5. The method of claim 4 wherein record IDs of an index to the database are found as data results and are combined together, and further comprising accessing and joining rows of different tables in the database pointed to by the record IDs to provide the final results table.

6. The method of claim 4 wherein the query is rewritten in disjunctive normal form before splitting the at least one non-Boolean term condition into separate tasks.

7. The method of claim 1 wherein the query does not include a UNION-type statement, and wherein the separate query portions are separate blocks of the query that are split by rewriting the query so that the separate blocks are on different sides of a created UNION-type statement, such that the separate blocks are executed independently.

8. A computer readable medium including program instructions to be implemented by a computer, the program instructions for searching for data in a database, the program instructions implementing steps comprising:
   receiving a query that is a request for data in the database, wherein the query identifies multiple tables in the database, the query including at least one uneven non-Boolean term condition including an OR condition having two predicates, wherein the OR condition spans and is satisfied by at least two tables of the multiple tables;
   splitting the at least one non-Boolean term condition into a plurality of separate query portions, wherein each predicate of the OR condition is provided to a different one of the separate query portions, each of the separate query portions providing a Boolean term that is satisfied by accessing a different particular one of the at least two tables;
   executing the separate query portions independently of each other to find at least one data result in each of the at least two tables that satisfies the Boolean term of each separate query portion, wherein a duplication of accesses to the different particular tables is minimized in the execution of the separate query portions, and wherein every corresponding row of the different particular tables does not need to be joined in order to check whether the corresponding rows satisfy the non-Boolean term condition;
   identifying at least one bridge table, the at least one bridge table being at least one of the multiple tables which does not satisfy the at least one uneven non-Boolean term condition and has at least one column from each of the different particular tables; and
   combining the data result from each separate query portion into a final result that satisfies the query, wherein the at least one identified bridge table is used to join each of the different tables to combine the data results.

9. The computer readable medium of claim 8 wherein the data results include rows in a table found from the execution of the separate query portions, and wherein rows duplicated between the data results from the separate query portions are removed from one of the data results.

10. The computer readable medium of claim 8 further comprising rewriting the query before splitting the non-Boolean term conditions into separate query portions, such that the number of separate query portions needed to be executed is reduced.

11. The computer readable medium of claim 8 wherein the separate query portions are separate tasks, each task being executed independently at runtime to find the data results for the Boolean term associated with that task.

12. The computer readable medium of claim 11 wherein record IDs of an index to the database are found as data results and are combined together, and further comprising accessing and joining rows of different tables in the database pointed to by the record IDs to provide the final results table.

13. The computer readable medium of claim 8 wherein the query does not include a UNION-type statement, and wherein the separate query portions are separate blocks of the query that are split by rewriting the query so that the separate blocks are on different sides of a created UNION-type statement, such that the separate blocks are executed independently.

14. A system for searching for data in a database, the system comprising: a storage device for storing data in a database, the data being referenced within a plurality of tables; and a processor coupled to the storage device, the processor receiving a query that is a request for data in the database, wherein the query identifies multiple tables in the database, the query including at least one uneven non-Boolean term condition including an OR condition having two predicates, wherein the OR condition t4~spans and is satisfied by at least two tables of the multiple tables; wherein the processor splits the at least one non-Boolean term condition into a plurality of separate query portions, wherein each predicate of the OR condition is provided to a different one of the separate query portions, each of the separate query portions providing a Boolean term that is satisfied by accessing a different particular one of the at least two tables, and wherein the processor is processing the query by executing the separate query portions independently of each other to find at least one data result in each of the at least two tables that satisfies the Boolean term of each separate query portion, wherein a duplication of accesses to the different particular tables is minimized in the execution of the separate query portions, and wherein every corresponding row of the different particular tables does not need to be joined in order to check whether the corresponding rows satisfy the non-Boolean term condition, and wherein the processor is identifies at least one bridge table, the at least one bridge table being at least one of the multiple tables which does not satisfy the at least one uneven non-Boolean term condition and has at least one column from each of the different particular tables, wherein the data results from each separate portion are combined into a final result that satisfies the query, wherein the at least one identified bridge table is used to join each of the different tables to combine the data results.

15. The system of claim 14 wherein the separate query portions are separate tasks, each task being executed independently to find the data results for the Boolean term associated with that task.

* * * * *